(12) United States Patent
Butera et al.

(10) Patent No.: US 6,439,356 B1
(45) Date of Patent: Aug. 27, 2002

(54) CONTROLLED OSCILLATING DAMPER

(75) Inventors: Francesco Butera; Stefano Alacqua, both of Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 09/620,221

(22) Filed: Jul. 20, 2000

(30) Foreign Application Priority Data

Jul. 20, 1999 (IT) .......................................... TO99A0643

(51) Int. Cl.$^7$ .................................................. F16F 9/53
(52) U.S. Cl. ................................ 188/267.2; 188/267.1; 188/317; 267/64.15
(58) Field of Search ............................... 188/267.2, 267, 188/267.1, 299.1, 316, 317, 320, 322.13, 322.15, 322.22; 267/64.15, 140.11, 140.14, 140.15

(56) References Cited

U.S. PATENT DOCUMENTS

| | | | |
|---|---|---|---|
| 5,277,281 A | * | 1/1994 | Carlson et al. .............. 188/267 |
| 5,398,917 A | * | 3/1995 | Carlson et al. .......... 267/140.14 |
| 5,601,164 A | * | 2/1997 | Ohsaki et al. .............. 188/274 |
| 5,984,056 A | * | 11/1999 | Agnihotri et al. ......... 188/267.2 |

FOREIGN PATENT DOCUMENTS

| | | |
|---|---|---|
| DE | 25 15 985 A | 10/1976 |
| EP | 0 392 274 A | 10/1990 |
| WO | WO 99 28652 A | 6/1999 |

OTHER PUBLICATIONS

J Li et al. "An electrorheological fluid damper for robots" m Proceedings of the Int'l. Conference on Robotics and Automation, New York, IEEE, May 21, 1995, pp. 2631–2636.

* cited by examiner

Primary Examiner—Pam Rodriguez
(74) Attorney, Agent, or Firm—Sughrue Mion, PLLC

(57) ABSTRACT

Oscillating damper comprising: a housing (12) defining a chamber (14) filled with damping fluid, an oscillating plate (22), movable within the chamber (14) and placed so as to divide the chamber (14) into two sections of variable volume (24, 26), and at least one passage (28) created in the oscillating plate (22) to enable the fluid to pass from one section to the other during the motion of the plate (22). The damping fluid is a magneto-rheological or electro-rheological fluid and an electrically-controlled excitation device (30) is placed in correspondence with the passage (28) to control the outflow resistance of fluid passing through the passage (28).

2 Claims, 1 Drawing Sheet

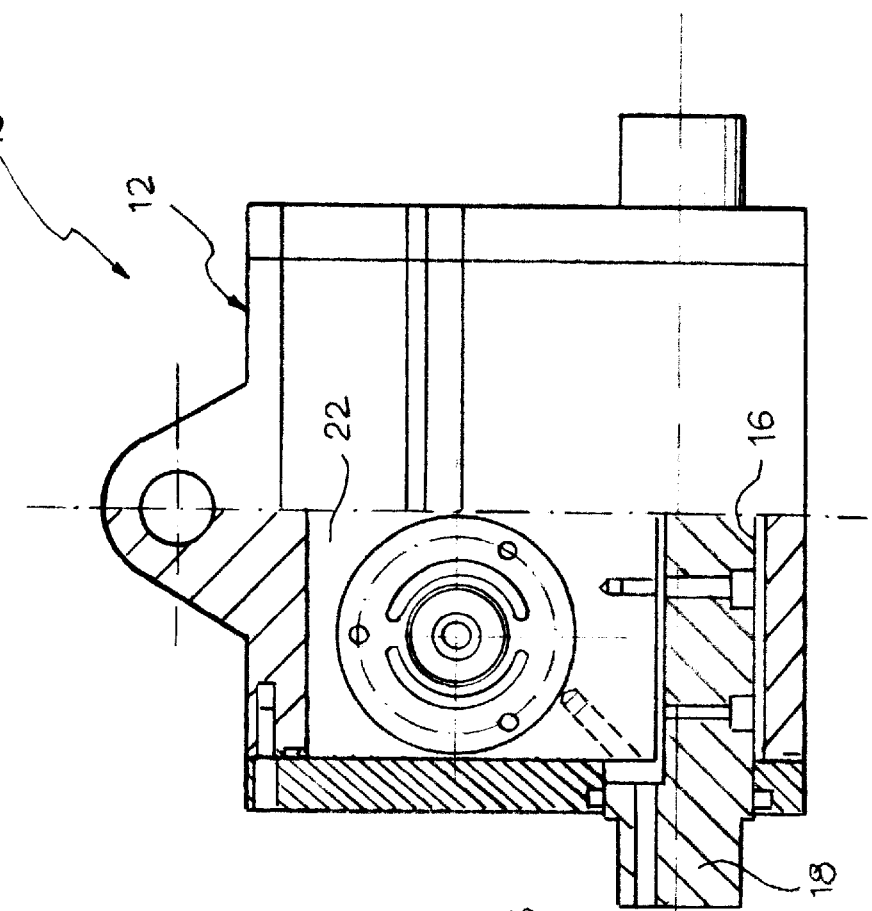
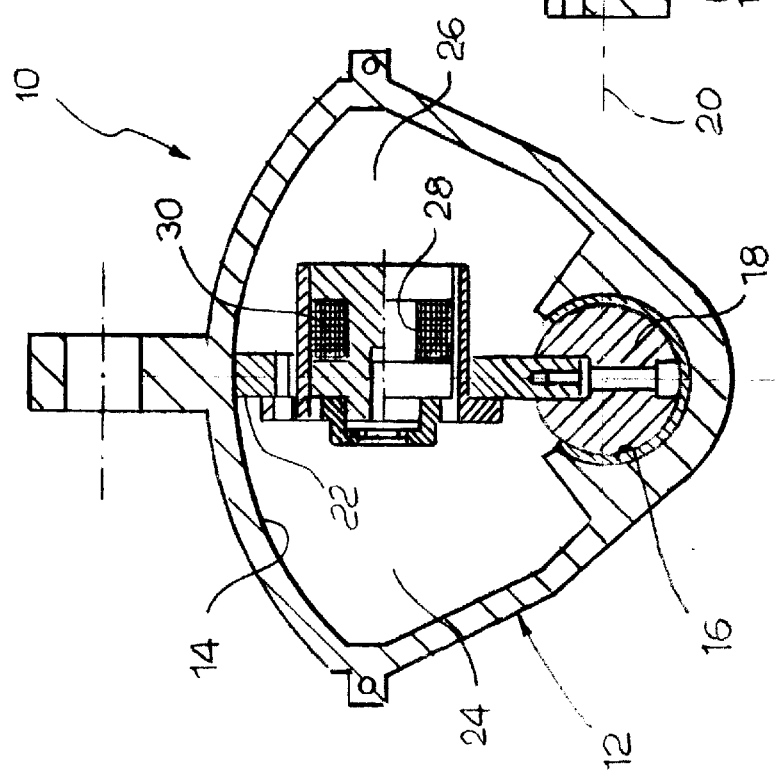

CONTROLLED OSCILLATING DAMPER

BACKGROUND OF THE INVENTION

The present invention concerns an oscillating damper of the kind comprising:
- a housing defining a chamber filled with damping fluid,
- a mobile oscillating plate inside the aforementioned chamber and placed so as to divide the chamber into two sections of variable volume, and
- at least one passage created in the oscillating plate to enable the fluid to pass from one section to the other during the motion of said plate.

The present invention is characterized by the fact that the damping fluid is a magneto-rheological or electro-rheological fluid and by the fact that an electrically-controlled excitation device is provided in correspondence with the aforementioned passage in order to control the flow resistance of the fluid passing through said passage.

The compositions of magneto-rheological or electro-rheological fluids undergo a change in apparent viscosity in the presence of a magnetic or electric field. Magneto-rheological fluids generally contain ferromagnetic or paramagnetic particles, typically with a diameter of the order of 0.1 $\mu$m, dispersed in a carrier fluid. In the presence of a magnetic field, these particles become polarized and organize themselves into chains of particles within the fluid. These chains of particles have the effect of increasing the fluid's apparent viscosity or global outflow resistance. In the absence of any magnetic field, the particles return to their disorganized or free state and the apparent viscosity or outflow resistance of the material is correspondingly reduced. Magneto-rheological materials have a controllable behavior that is similar to the one observed in electro-rheological materials, which respond to an electric field instead of a magnetic one.

Both electro-rheological and magneto-rheological materials are useful in providing variable damping forces inside devices such as shock absorbers and elastomeric bearings.

SUMMARY OF THE INVENTION

Currently-known magneto-rheological dampers are typically of the type comprising a cylinder and a piston. These dampers have relatively high working pressures (around 30 bar) and must be fitted with sealing elements on the piston rod. Magneto-rheological or electro-rheological fluids are abrasive and the dampers using such fluids tend to have leakage problems.

An oscillating damper made according to the present invention enables a reduction in the working pressure (e.g. 10 instead of 30 bar) with respect to a cylinder and piston damper of comparable features and consequently poses fewer problems from the point of view of fluid leakage.

Another important advantage of the damper made according to the present invention is that the fluid is subject to lower outflow velocities than those occurring in a cylinder and piston type of damper and this enables the damping characteristics to be controlled more easily and accurately.

BRIEF DESCRIPTION OF THE DRAWINGS

Further characteristics and advantages of the damper made according to the present invention will become evident in the course of the detailed description that follows, given purely as a nonlimiting example, with reference to the attached drawings in which:

FIG. 1 is a schematic axial section of a damper made according to the present invention, and FIG. 2 is a partially sectioned lateral view of the damper illustrated in FIG. 1.

DETAILED DESCRIPTION OF THE INVENTION

With reference to the drawings, the numeral 10 indicates a controlled oscillating damper made according to the present invention. The damper 10 includes a housing 12 defining a cavity 14 and a cylindrical seat 16. The shaft 18 is mounted in the cylindrical cavity 16 so as to rotate freely around its own longitudinal axis 20. Portions of the ends of the shaft 18 extend outwards from the housing 12 and are destined to be attached to the element that has to undergo a controlled damping of the oscillating movement around the axis 20. A plate 22 is attached to the oscillating shaft 18 and is movable within the chamber 14. The plate 22 divides the chamber 14 into two sections of variable volume 24 and 26. At least one passage 28 is created in the plate 22 so that the sections 24 and 26 are in fluid communication.

The cavity 14 is filled with a magneto-rheological or electro-rheological damping fluid of known type, the damping characteristics of which vary as a function of the intensity of a magnetic or electric field applied to the fluid. The plate 22 carries an excitation device 30 composed, for instance, of an electric winding installed coaxially to the aforesaid passage 28. The excitation device 30 generates an electric or magnetic field of variable intensity that is brought to bear on the passage 28. By adjusting the excitation current on the winding 30 it is consequently possible to vary the damping effect of the oscillatory movement of the shaft 18—and of any elements connected to it—around the axis 20.

Of course, without prejudice to the principle of the invention, the construction details and types of implementation can vary considerably with respect to the version described and illustrated here, without departing from the context of the present invention, as defined in the claims that follow.

We claim:

1. An oscillating damper comprising, a housing defining a chamber filled with a damping fluid and a longitudinal cylindrical seat, a shaft rotatably mounted in said longitudinal seat for rotation about a longitudinal axis of the shaft, an oscillating plate connected to and extending radially outwardly from the shaft into the chamber, said plate having a plane containing said longitudinal axis of the shaft, said oscillating plate being moveable within said chamber upon rotation of said shaft and arranged to divide the chamber into two sections of variable volume, and at least one passage in the oscillating plate to enable the fluid to pass from one section to the other during the oscillating motion of the plate, wherein the damping fluid is a magneto-rheological or electro-rheological fluid and an electrically-controlled excitation device is provided on the plate in correspondence with the passage to control the flow resistance of the fluid moving through the passage.

2. An oscillating damper as set forth in claim 1 wherein the excitation device is an electrical winding disposed coaxially to the passage.

* * * * *